Dec. 24, 1935.  L. J. BERKELEY  2,025,085
ELECTRIC COOKING APPARATUS
Filed Oct. 8, 1931

INVENTOR
BY L. J. Berkeley
Frease and Bishop ATTORNEYS

Patented Dec. 24, 1935

2,025,085

UNITED STATES PATENT OFFICE 2,025,085

ELECTRIC COOKING APPARATUS

Laurence J. Berkeley, Cleveland, Ohio

Application October 8, 1931, Serial No. 567,638

10 Claims. (Cl. 219—19)

My invention relates to apparatus for cooking or heating articles of food by passing an electric current directly through the article being cooked, and more particularly my invention relates to such apparatus particularly adapted for rapidly cooking articles of food such as wieners.

For such purposes it is necessary that the food articles such as the wiener may be quickly placed and removed from the apparatus, the electrical control for the apparatus must be safe and simple, and the apparatus must be capable of continuous operation without being affected in any substantial manner by grease or similar substances educed from the articles during the cooking process.

Moreover, in the case of wieners, it is essential that after cooking the wieners shall have an edible appearance, and shall not be scorched in spots or streaks, and shall not have burst.

It has been determined by experiment that cooking a wiener by merely placing the same in contact with two electrodes in an alternating current circuit having a potential difference, results in a non-uniform and unsatisfactory cooking of the wiener, with an undesirable eduction of greases which soon act as an insulator for the electrodes.

Accordingly the objects of the present improvements include the provision of an electric cooking apparatus, adapted for convenient and economical production having a novel, simplified, convenient, and safe arrangement of its electrical parts and control means, and arranged so that a substantial number of wieners may be quickly placed therein, quickly and properly cooked, and quickly removed therefrom.

The foregoing and other objects are attained by the apparatus, machine, parts, improvements, and combinations, which comprise the present invention and which are particularly and distinctly pointed out and set forth in the appended claims forming part hereof.

In general terms, the improved electric cooking apparatus hereof includes spaced receptacles, preferably of insulating material, an electrode located in each receptacle, each receptacle being adapted to be filled with an electrolyte such as salt water, and being arranged for engaging an end of a wiener, and switch means operatively connecting and disconnecting the electrodes and a source of electric current.

Figure 1:
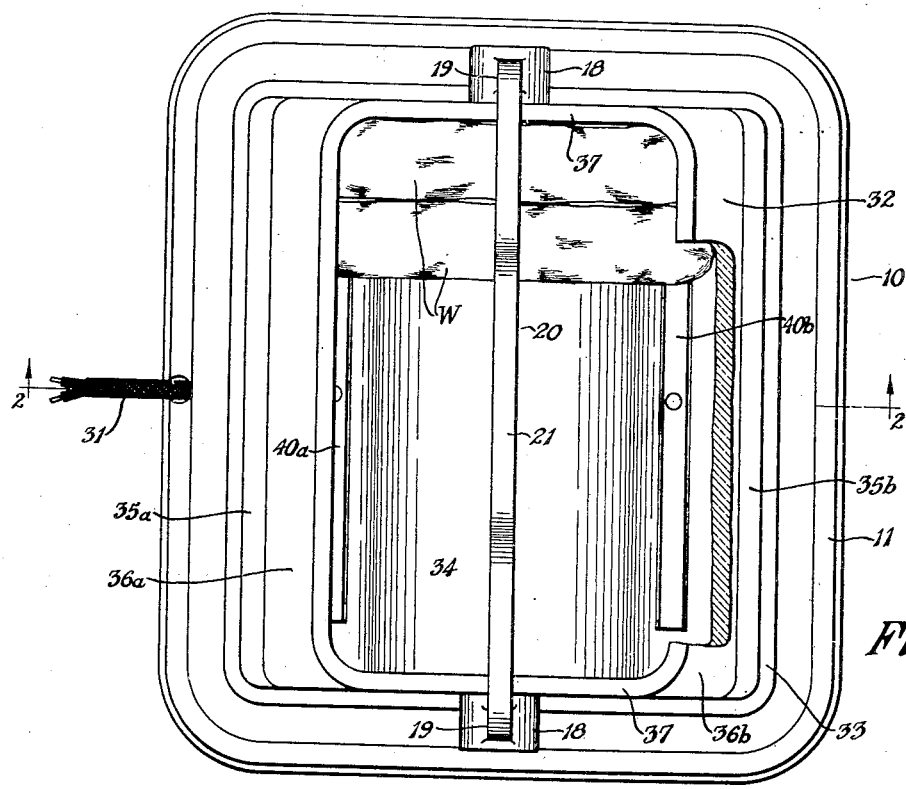
Figure 2:
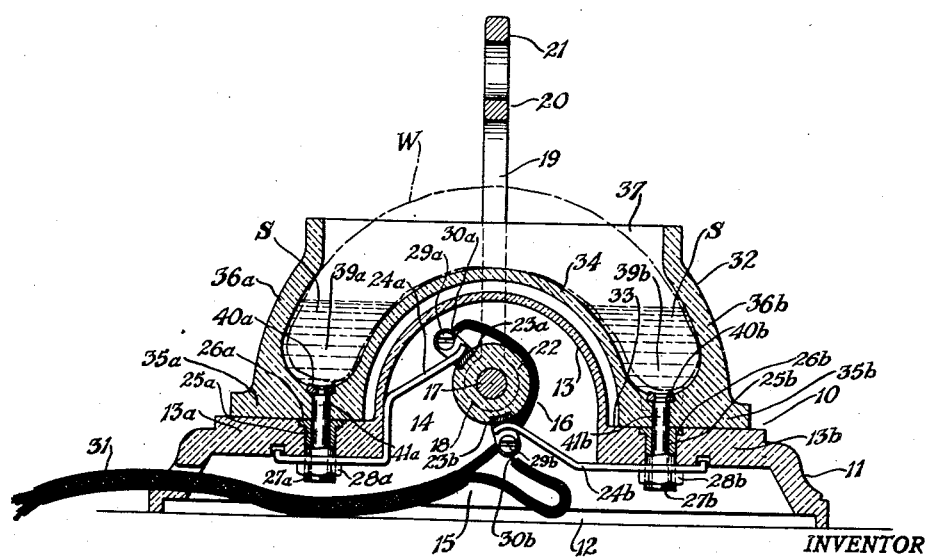

A preferred embodiment of the present improvements is illustrated in the accompanying drawing forming part hereof, in which Figure 1 is a fragmentary top plan view of the improved electric cooking apparatus; and Fig. 2, a transverse sectional view thereof as on line 2—2, Fig. 1.

Similar numerals refer to similar parts throughout the drawing.

A preferred embodiment of the invention is indicated generally by 10, and includes a base 11 preferably made of insulating material such as phenol-resin compounds, and the underside 12 of the base 11 is preferably concave for receiving and mounting certain of the electrical parts of the apparatus, and as illustrated the base 11 includes a central longitudinally extending arch wall 13 spanning between longitudinally extending normally horizontal foot walls 13a and 13b, and forming a downwardly opening longitudinally extending dome chamber 14, and a closure wall 15 is provided for each end of the dome chamber 14.

A rotary switch indicated generally by 16 is operatively mounted within the chamber 14, and the switch 16 preferably includes a longitudinally extending shaft 17 whose ends are journalled and extend through the base end closure walls 15.

Each outer end of the shaft 17 on the outside of its journalling end closure wall 15 has secured thereto the lower end 18 of one of the legs 19 of a U-shaped downwardly opening switch handle indicated generally by 20, and which includes in addition to the legs 19, a spanning member 21 extending between the upper ends of the legs 19.

Within the chamber 14 a sleeve 22 of insulating material is secured on the shaft 17, and spaced contact lugs 23a and 23b are mounted on the insulating sleeve 22.

A preferably spring contact member 24a is secured at its lower end to the base foot wall 13a, and the upper end of the contact member 24a extends upwardly between the dome chamber and the sleeve and is spring pressed against the sleeve 22 for connecting with the contact lugs 23a when the handle 20 is rotated so its legs 19 are vertical as illustrated in the drawing.

Similarly a preferably spring contact member 24b is secured at its lower end to the foot wall 13b, and the upper end of the contact member 24b spring presses against the sleeve 22 for connecting with the contact lug 23b when the switch handle 20 is swung to the position illustrated in the drawing.

The spring contact member 24a is preferably secured to the foot wall 13a by means of a shouldered sleeve 25a which extends through a counterbored aperture formed in the foot wall 13a and through an aperture formed in the contact member 24a, the shoulder 26a of the sleeve 25a being located at the upper end of the sleeve and being seated in the counterbore at the upper end of the foot wall aperture, and the lower end 27a of the sleeve being threaded and having a nut 28a screwed thereon and clamping the contact member 24a against the lower surface of the foot wall 13a.

Similarly, the spring contact member 24b is preferably secured to the foot wall 13b by means of a shouldered sleeve 25b which extends through a counterbored aperture formed in the foot wall 13b and through an aperture formed in the contact member 24b, the shoulder 26b of the sleeve 25b being located at the upper end of the sleeve and being seated in the counterbore at the upper end of the foot wall aperture, and the lower end 27b of the sleeve being threaded and having a nut 28b screwed thereon and clamping the contact member 24b against the lower end of the foot wall 13b.

The contact lugs 23a and 23b are connected as by screws 29a and 29b, respectively, with the terminals 30a and 30b, respectively, of the conductors of a cable 31 which may be connected with a suitable source of electric current, such as a standard 110 volt a. c. power circuit, not shown.

The switch handle 20 may be swung from the position illustrated in the drawing to a horizontal position, in which horizontal position the contact lugs 23a and 23b are rotated out of connection respectively with the contact members 24a and 24b.

The cooking apparatus 10 includes in addition to the base 11, a preferably unitary combined food article mounting and electrolyte receptacle means including a housing 32 which is preferably separably supported on the upper face 33 of the base 11.

The housing 32 includes a longitudinally extending central arch wall 34 which extends over the base arch wall 13, and the arch wall 34 spans between foot walls 35a and 35b resting respectively upon the upper faces of the base foot walls 13a and 13b.

Side walls 36a and 36b are laterally spaced on opposite sides from the arch wall 34, and the walls 36a and 36b extend upwardly from the foot walls 35a and 35b, respectively, and longitudinally between end walls 37, whereby laterally spaced longitudinally extending wiener end engaging receptacles 39a and 39b are formed between the end walls 37, the side walls 36a and 36b and the arch wall 34.

The receptacles 39a and 39b thus have a common access opening, and the arch wall 34 extends laterally between the adjacent inner sides of the upper ends of the receptacles.

The receptacle forming and electrode mounting housing 32 is preferably made of insulating material, such as a phenol-resin compound or a ceramic material, and a longitudinally extending electrode 40a is located in the upper surface of the housing wall 35a, and similarly a longitudinally extending electrode 40b is located in the upper surface of the housing wall 35b, and the normally upper surfaces of the electrodes 40a and 40b are exposed, as illustrated.

A contact pin 41a is preferably imbedded in the wall 35a, and the normally upper end of the contact pin 41a is connected with the electrode 40a, and the contact pin 41a extends below the normally lower surface of the wall 35a and is separably inserted in the bore of the conductor sleeve 45a.

Similarly a contact pin 41b is preferably imbedded in the wall 35b, and the normally upper end of the contact pin 41b is connected with the electrode 40b, and the contact pin 41b extends below the normally lower surface of the wall 35b and is separably inserted in the bore of the conductor sleeve 45b.

An electrolyte which may be salt water indicated by S is placed in each receptacle 39a and 39b and one or more wieners W are inserted in the apparatus as indicated in full lines in Fig. 1 and in dot-dash lines in Fig. 2, with the opposite ends of each wiener located respectively in the receptacles 39a and 39b containing the electrolyte, as aforesaid, and each wiener being bent over the arch wall 34.

Accordingly when the switch handle 20 is swung to the position illustrated in the drawing, current is passed through the wieners in the apparatus, whereby the wieners are very rapidly cooked and any grease or fat educed therefrom floats on the top of the electrolyte.

I claim:

1. Cooking apparatus including two spaced receptacles, one of the receptacles being adapted for receiving one end portion of an article of food and the other receptacle being adapted for receiving another end portion of the article of food, an electrode located in each receptacle and adapted for making electrical contact with the portion of the article of food received therein, and means for operatively connecting and disconnecting the electrodes and a source of electric current, and the receptacles having a common access opening and a wall extending laterally between opposite inner side walls of the receptacles.

2. Cooking apparatus including two spaced engaging means, an electrode adjacent each engaging means, one engaging means being adapted for engaging one end portion of an article of food and connecting the same with the one adjacent electrode and the other engaging means being adapted for engaging another end portion of the article of food and connecting the same with the other adjacent electrode, and means for operatively connecting and disconnecting the electrodes and a source of electric current, and the receptacles having a common access opening and a wall extending laterally between opposite inner side walls of the receptacles.

3. Cooking apparatus including two spaced receptacles, an electrolyte in each receptacle, one of the receptacles being adapted for receiving one end portion of an article of food and the other receptacle being adapted for receiving another end portion of the article of food, an electrode located in each receptacle and adapted for making electrical contact with the portion of the article of food received therein, and means for operatively connecting and disconnecting the electrodes and a source of electric current, and the receptacles having a common access opening and a wall extending laterally between opposite inner side walls of the receptacles.

4. Cooking apparatus including two spaced receptacles, one of the receptacles being adapted for reeciving one end portion of an article of food and the other receptacle being adapted for receiving another end portion of the article of food, an electrode located in each receptacle and adapted for making electrical contact with the portion of the article of food received therein, and the electrodes being adapted for connection with a source of electric current, and the receptacles having a common access opening and a wall extending laterally between opposite inner side walls of the receptacles.

5. Cooking apparatus including two spaced engaging means, an electrode adjacent each engaging means, one engaging means being adapted for engaging one end portion of an article of food and connecting the same with the one adjacent electrode and the other engaging means being adapted for engaging another end portion of the article of food and connecting the same with the other adjacent electrode, and the electrodes being adapted for connection with a source of electric current, and the engaging means having a common access opening and a wall extending laterally between opposite inner sides of the engaging means.

6. Cooking apparatus including two spaced receptacles, an electrolyte in each receptacle, one of the receptacles being adapted for receiving one end portion of an article of food and the other receptacle being adapted for receiving another end portion of the article of food, an electrode located in each receptacle and adapted for making electrical contact with the portion of the article of food received therein, and the electrodes being adapted for connection with a source of electric current, and the receptacles having a common access opening and a wall extending laterally between opposite inner side walls of the receptacles.

7. Cooking apparatus including a base, a pair of spaced contact members on the base, means for operatively connecting and disconnecting the contact members and a source of electric current, a unitary vessel including two spaced receptacles, one of the receptacles being adapted for receiving one end portion of an article of food and the other receptacle being adapted for receiving another end portion of the article of food, an electrode located in each receptacle and adapted for making electrical contact with the portion of the article of food received therein, and a connector member connected with each electrode and separably engaged with one of the base contact members, the connector members and the base contact members being located and formed to mutually interfit with each other.

8. Cooking apparatus including a base, a pair of spaced contact members on the base, the contact members being adapted for connection with a source of electric current, a unitary vessel including two spaced receptacles, one of the receptacles being adapted for receiving one end portion of an article of food and the other receptacle being adapted for receiving another end portion of the article of food, an electrode located in each receptacle and adapted for making electrical contact with the portion of the article of food received therein, and a connector member connected with each electrode and separably engaged with one of the base contact members, the connector members and the base contact members being located and formed to mutually interfit with each other.

9. Cooking apparatus including a base, a pair of spaced contact members on the base, means for operatively connecting and disconnecting the contact members and a source of electric current, a unitary vessel including two spaced receptacles, one of the receptacles being adapted for receiving one end portion of an article of food and the other receptacle being adapted for receiving another end portion of the article of food, an electrode located in each receptacle and adapted for making electrical contact with the portion of the article of food received therein, a connector member connected with each electrode and separably engaged with one of the base contact members, and an electrolyte in each receptacle, the connector members and the base contact members being located and formed to mutually interfit with each other.

10. Cooking apparatus including a base, a pair of spaced contact members on the base, the contact members being adapted for connection with a source of electric current, a unitary vessel including two spaced receptacles, one of the receptacles being adapted for receiving one end portion of an article of food and the other receptacle being adapted for receiving another end portion of the article of food, an electrode located in each receptacle and adapted for making electrical contact with the portion of the article of food received therein, a connector member connected with each electrode and separably engaged with one of the base contact members, and an electrolyte in each receptacle, the connector members and the base contact members being located and formed to mutually interfit with each other.

LAURENCE J. BERKELEY.